United States Patent
Coles

(10) Patent No.: US 8,905,887 B2
(45) Date of Patent: Dec. 9, 2014

(54) UNISON RING GEAR ASSEMBLY

(71) Applicant: Rolls-Royce PLC, London (GB)

(72) Inventor: David Roger Coles, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/761,297

(22) Filed: Feb. 7, 2013

(65) Prior Publication Data

US 2013/0210572 A1    Aug. 15, 2013

(30) Foreign Application Priority Data

Feb. 13, 2012    (GB) .................................. 1202383.4

(51) Int. Cl.
| | | |
|---|---|---|
| F16H 29/04 | (2006.01) | |
| F16H 1/28 | (2006.01) | |
| F01D 17/16 | (2006.01) | |
| F01D 17/20 | (2006.01) | |

(52) U.S. Cl.
CPC ................ *F16H 1/28* (2013.01); *F01D 17/162* (2013.01); *F01D 17/20* (2013.01); *F05D 2260/53* (2013.01)
USPC .............. 475/170; 475/162; 475/331; 74/352

(58) Field of Classification Search
USPC .......................................... 475/331, 170, 169
See application file for complete search history.

(56) References Cited

U.S. PATENT DOCUMENTS

| | | | |
|---|---|---|---|
| 3,632,224 A | | 1/1972 | Wright et al. |
| 3,721,130 A | * | 3/1973 | McKee .............................. 74/86 |
| 3,876,334 A | | 4/1975 | Andrews |
| 4,825,726 A | * | 5/1989 | Schofield ...................... 475/174 |
| 6,039,534 A | | 3/2000 | Stoner et al. |
| 2009/0104022 A1 | | 4/2009 | Suljak et al. |
| 2012/0079809 A1 | * | 4/2012 | Glynn et al. .................... 60/268 |

FOREIGN PATENT DOCUMENTS

| | | |
|---|---|---|
| EP | 2 053 204 A2 | 4/2009 |
| GB | 1259739 A | 1/1972 |
| GB | 2301867 A | 12/1996 |
| GB | 2410530 A | 8/2005 |

OTHER PUBLICATIONS

May 7, 2013 Search Report issued in European Patent Application No. EP 13 15 4356.
May 29, 2012 Search Report issued in British Patent Application No. 1202383.4.

* cited by examiner

*Primary Examiner* — Troy Chambers
*Assistant Examiner* — Lillian Nguyen
(74) *Attorney, Agent, or Firm* — Oliff PLC

(57) ABSTRACT

Disclosed is a unison ring assembly. The assembly comprises a first unison ring and a second unison ring concentrically aligned along a principal axis, the first and second unison rings being rotatable about the principal axis. The assembly further comprises a gear mechanism configured to simultaneously rotate the first and second unison rings about the principal axis.

18 Claims, 4 Drawing Sheets

UNISON RING GEAR ASSEMBLY

TECHNICAL FIELD OF INVENTION

This invention relates generally to an actuation mechanism for variable vanes in an axial flow gas turbine engines. The vanes are variable in that they are rotatable about their major axis such that the delivery angle of fluid flow to a rotor stage of a compressor or the like may be altered to benefit the performance of the engine. Although principally geared towards gas turbine engines, the invention may be applicable to other engines or devices which have arrays of rotatable members.

BACKGROUND OF INVENTION

FIG. 1 shows a ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36. The engine has a principal axis of rotation 44.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

It is commonplace in state of the art gas turbine engines 10 to include variable vanes at various locations in the engine to generally help control the air flow passing through the engine core, thus improving the performance of the engine. FIG. 2 illustrates a typical Variable Stator Vane assembly 210 which is used in various engines for aerospace, industrial and marine applications.

The assembly includes four unison rings 212 coaxially arranged relative to the principal axis 44 of the engine 10 around the exterior of the intermediate compressor 18 (not shown in FIG. 2). Each unison ring 212 has a plurality of lever arms 214 each of which attach to a vane spindle (not shown) via the mounting holes 216 located in the distal end thereof. The aerofoil portions of the vanes are rotatably mounted within the airflow path of the compressor 18 such that they can rotate about the major axis of the vane which is coincidental with the rotational axis of the spindle. The unison rings 212 are arranged such that rotating them around the principal axis of the engine results in the lever arms 214 pivoting about the vane spindles, thereby rotating them and the aerofoil portions within the airflow channel of the compressor 18.

To rotate the unison rings, an input link is provided to engage with a crankshaft which drives the unison rings via link rods. As the levers rotate around the centre of rotation of the vane spindles, the lever arms fixed interface with the unison ring requires that the unison ring translates axially as well as circumferentially as it translates.

This design requires that all the interfaces between moving components have bushes fitted to accommodate the necessary movement. Additionally, to keep the unison rings circular as they accommodate the loads within the system, the rings are fitted with centralising features that contact the casings to maintain roundness. This can be achieved by using mushroom headed bolts or centralising screws which contact pads that are bonded or bolted to the engine casing.

This assembly is unnecessarily complex and heavy. Thus, the present invention seeks to provide an alternative arrangement.

STATEMENTS OF INVENTION

In a first aspect, the present invention relates to a unison ring assembly, comprising: a first unison ring and a second unison ring concentrically aligned along a principal axis, the first and second rings being rotatable about the principal axis; and, a gear mechanism for simultaneously rotating the first and second unison rings about the principal axis.

The gear mechanism includes a sun planet gear arrangement. The first unison ring may be the ring gear and the second unison ring may be the sun gear.

The gear mechanism may be arranged to rotate the unison rings at different speeds.

The planet gear may be eccentrically mounted so as to have a rotational axis which is offset by different amounts relative to each of the first and second unison ring gears.

The planet gear may include a first section which engages with the ring gear and a second section which engages with the sun gear. The gear ratio of the first and second sections may be different.

The first unison ring may be radially outwards of the second unison ring with respect to the principal axis of the engine.

The unison ring assembly may further comprise a plurality of planet gears distributed around the unison ring gears. The plurality of planet gears may be arranged to concentrically align the unison ring gears about the principal axis.

The or each planet gear may be arranged to axially locate the sun and planet gears relative to the principal axis.

The or each planet gear may be arranged to axially and radially align the unison rings.

The unison ring assembly may further comprise at least one actuator connected to and configured to directly rotate one of the ring gear, planet or sun gear.

The unison ring assembly is for a gas turbine engine. The first and second unison rings may be connected to variable stator guide vanes.

DESCRIPTION OF DRAWINGS

The following drawings are used to describe embodiments of the present invention.

DETAILED DESCRIPTION OF INVENTION

Figure 1:
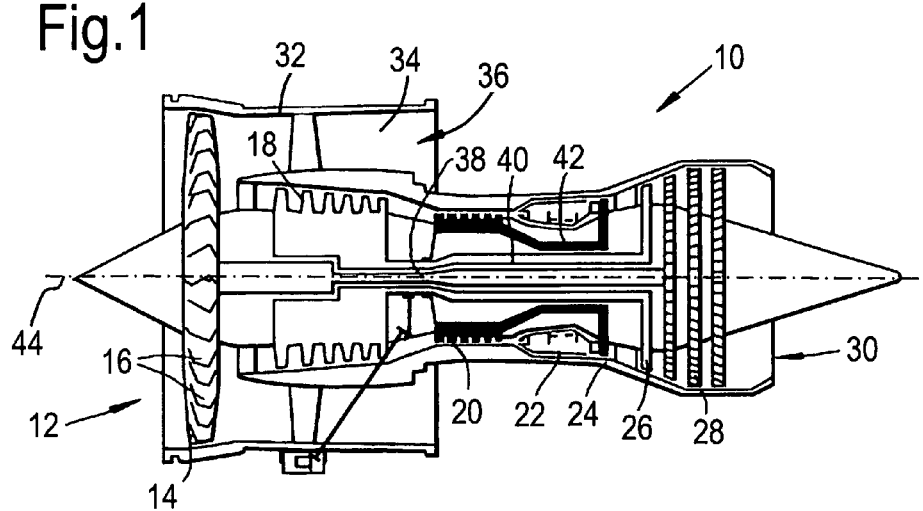
FIG. 1 shows a known ducting fan gas turbine engine.
Figure 2:
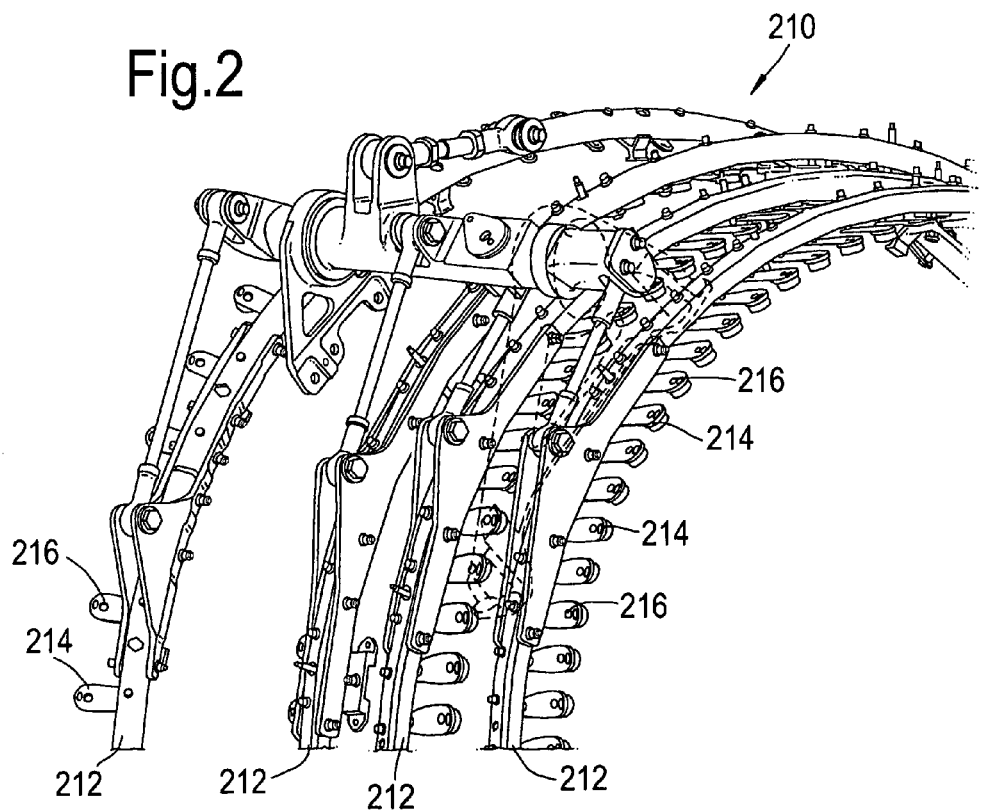
FIG. 2 shows a known unison ring assembly.
Figure 3:
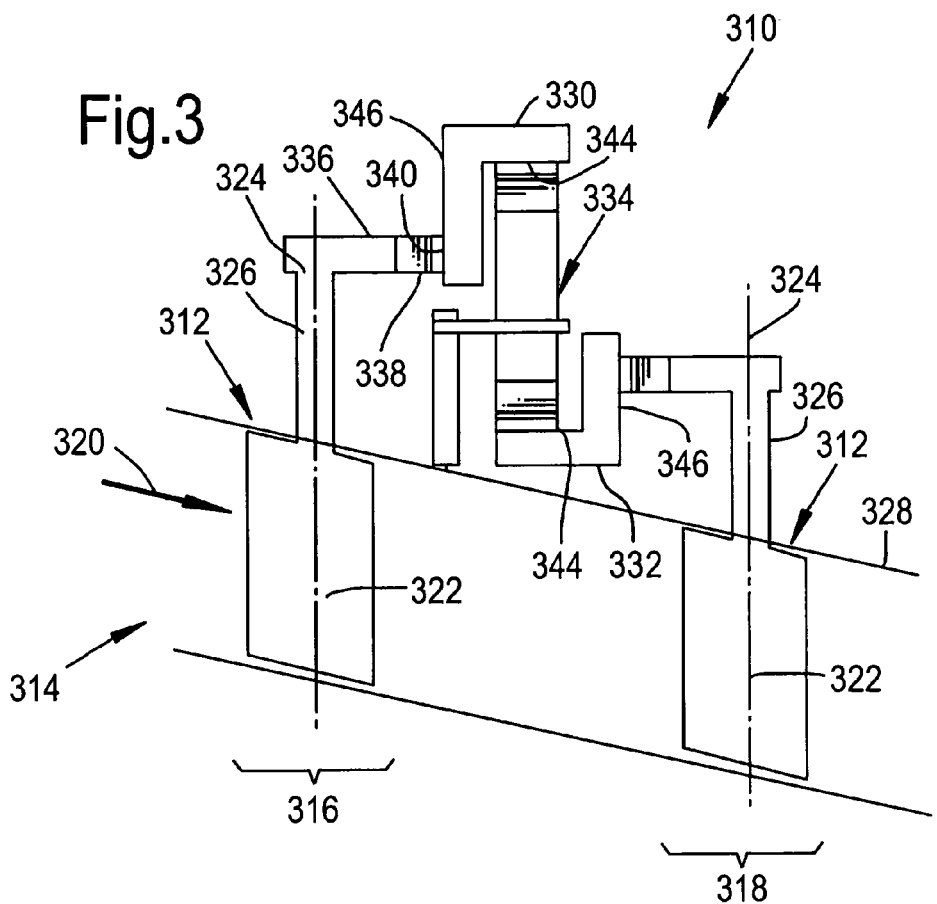
FIG. 3 shows a cross section of a unison ring assembly according to the invention.

In FIG. 3 there is shown a unison gear ring assembly 310 according to the present invention. The unison gear ring assembly 310 is arranged to provide rotational adjustment to a plurality of rows of variable vanes 312 in an annular compressor of a axial flow gas turbine engine, similar to the one shown in FIG. 1.

In FIG. 3 there is shown a portion of a compressor 314 having a first stage 316 and a second stage 318 of variable vanes 312 which are arranged in axial flow series, the axial flow being referenced by arrow 320. In the described embodiment, the variable vanes 312 are stator vanes (VSVs), but the invention may be of broader application within a gas turbine engine, or elsewhere. It is to be noted that although FIG. 3 only shows one vane per stage, this is one of an annular array of blades. Further, although not shown, the variable vanes 312 will be interspersed with rotors having rotor blades in a working engine, as is well known in the art. Further, there may be more than two rows of variable vanes. Indeed, it is well known to have at least four VSVs in a gas turbine engine.

Each of the VSVs includes an aerofoil portion 322 which is located within the airflow 320 channel of the compressor 314 and is mounted therein so as to be rotatable about a radially extending major axis 324 of the vane. The radially outer end of the aerofoil portion 322 of the vane 312 adjoins a spindle 326 which is coaxial with the rotational, major axis 324 of the vane 312 and which projects through the compressor wall 328 into the space which occupies the unison ring gear 310. The spindle 326 engages with the unison ring gear 310 which is actuable so as to rotate the spindle 326 and thus the angle of the VSV 312 relative to the direction of the gas flow in the compressor when in use. Hence, in use, the gas flow delivery angle of the vane 312 can be adjusted as required for a particular performance.

The unison ring assembly 310 includes a first unison ring 330 and a second unison ring 332, each being associated with and arranged to rotate a stage of VSVs 316, 318. The unison rings 330, 332 are rotatably mounted about the principal axis of the engine and are engaged and simultaneously driven by a single gear mechanism 334 so as to rotate the unison rings.

The engagement between the unison rings 330, 332 and the respective spindles 326 is by way of a rack and pinion type of arrangement in which the spindles 326 of the VSVs 312 carry a flange 336 or lever arm which has a toothed rim 338 so as to effectively provide a cog, or pinion, for engagement with a corresponding geared section 340, or rack, on its respective unison rings 330, 332.

Figure 4:
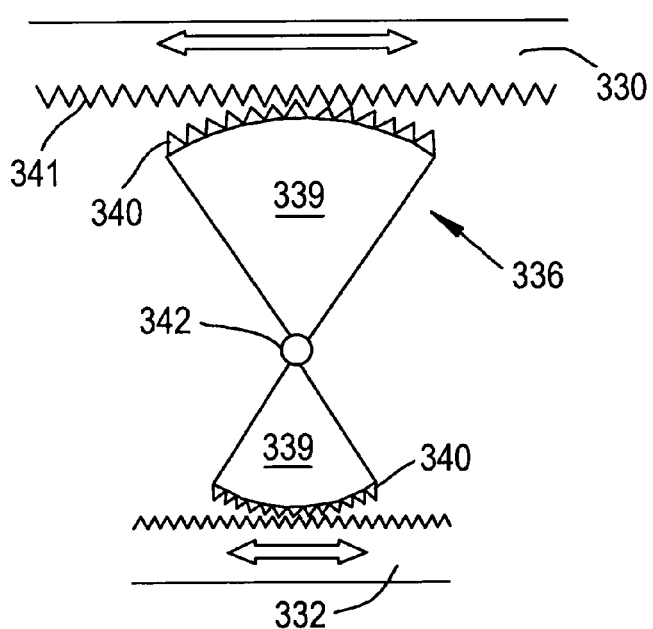
FIG. 4 shows an axial view of a planet gear of an embodiment of the invention.

An axial view of the gear mechanism 334 which drives the unison rings 330, 332 of the described embodiment is shown in FIG. 4. The gear mechanism is in the form of a sun and planet gear system having a plurality of rack and pinion type gears to translate the force between the respective members of the arrangement. In the embodiment, the first unison ring 330 provides the ring gear, the second unison ring 332 provides the sun gear, and a driving member 336 provides the planet gear. The driving member 336 includes two opposing arcuate segments 339 of plate having a toothed rim 340 which engages with a corresponding toothed section 341 on the unison ring gears 330, 332. The driving member 336 is rotatably mounted on a spindle 342 which is cantilevered from the wall of the compressor 328 or other suitable structure. The arrangement is such that rotating the driving member 336 results in a rotation of the unison rings 330, 332, which, in turn, rotates the respective VSVs 312 via the spindles 326.

In the described embodiment, the driving member 336 is asymmetric in that it is eccentrically mounted on the spindle 342. Thus, the distance from the spindle 342 to the each respective unison ring 330 332 is different. Specifically, the distance between the first unison ring 330 and spindle 342 is greater than that of the spindle 342 to the second unison ring 332. With this arrangement, the gear ratio between the driving member and each unison ring can be different and thus the range of travel of one unison ring 330 332 can be different to that of the other. This means that the range of angular rotation of each unison ring and the associated deflection experienced by each VSV 312 can be different for a common angle of actuation from the driving member 336 which can be advantageous. As can be seen from FIG. 4, the number and pitch of the gear teeth 340 for each of the unison rings 330 332 may be different so as to accommodate this difference in gearing.

In more detail, the unison rings 330 332 can be described as having an annular radial face 344 and an axially facing surface 346. In the described embodiment, these are provided by having a unison ring gear 330 332 which is substantially L shaped in cross section which comprises a radially extending annular plate lying perpendicular relative to the principal axis of the engine and, adjoined to one end of the plate, an annular flange which extends in an axial direction so as to form a short cylindrical portion. Thus, a surface of the annular plate provides the axially facing surface 344 and cylindrical section provides the radially facing surface 346, each having a toothed section for engagement with driving member 336.

In the described embodiment, the unison ring members 330 332 are placed in a radially separated manner such that radially facing surfaces of each unison ring member, and the respective toothed sections, oppose one another. In this way, the unison rings are balanced across the driving member 336 and the spacing between the unison ring members 330, 332 can be maintained by the driving members 336. This is particularly advantageous where a plurality of the driving members 336 are spaced around the compressor 18 in a circular array, as it naturally retains the unison ring gears 330, 332 in concentric relation to each other and removes, or at least reduces, the need to have other centralising features. Such features can be found in the prior art systems and would include the centralising screws and pads as mentioned above in the background section.

It will be appreciated that variations in the constructional detail of the described embodiment are possible within the scope of the invention. For example, the unison rings 330, 332 may not be L shaped, but may be box sections or some other shape which provides the necessary rigidity. Further, the unison rings 330,332 may include weight saving or strengthening features not described here, but which may affect the overall shape of the unison rings 330, 332.

Figure 5:
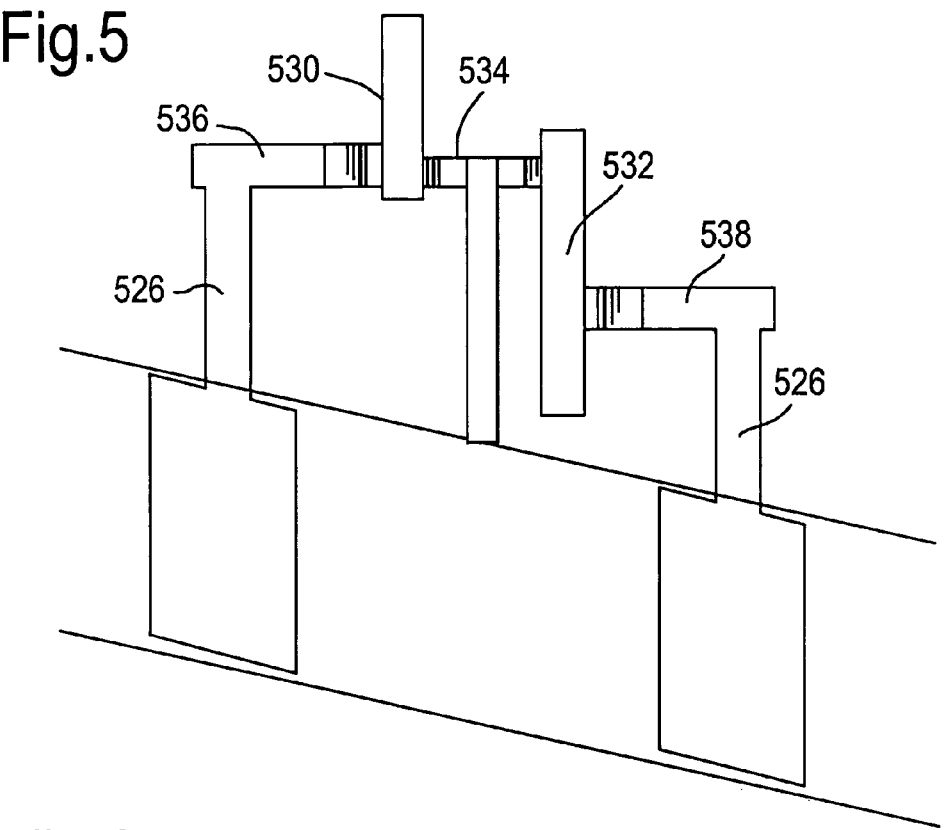
FIG. 5 shows an alternative embodiment of the present invention.

In another embodiment, as shown in FIG. 5, the unison ring gears 530, 532 each comprise a radially extending plate having toothed sections on both axially facing surfaces. The two unison rings 530, 532 are substantially similar and oppose one another along the longitudinal axis of the engine so as to provide in axial series a toothed flange 536 of the first stage vane spindle, a first unison ring 530, a driving member 534, a second unison ring 532 and a second toothed spindle flange 538, with the driving member 534 sitting in a tangential plane relative to the principal axis of the engine. Thus, the unison rings are maintained in place between the two spindles 526 and driving member 534 so there is no axial displacement of the unison rings during use.

It is of note that the first and second unison rings 530, 532 shown in FIG. 5 have different radial lengths with the racks of the first unison gear 530 opposing each other at a common radial distance from the principal axis of the engine, but with the racks of the second unison ring gear 532 being radially offset. This allows for a common length of spindle 526 to be accommodated for each stage of the compressor 18 when the compressor has a generally convergent geometry and thus inclined walls relative to the principal axis 44 of the engine.

A technical advantage of the two embodiments described above is that the rotational forces exerted to on the unison rings 330, 332, 530, 532 and spindles 326, 526 are all about constant axes of rotation before, during and after rotation. Hence, no axial or radial translation of the unison ring gears 330, 332, 530, 532 or spindles 326, 526 occurs in use. Thus, the requirements from the supporting mechanisms are simplified and the loads can be substantially carried by the spindles and driving members 336, 534.

Figure 6:
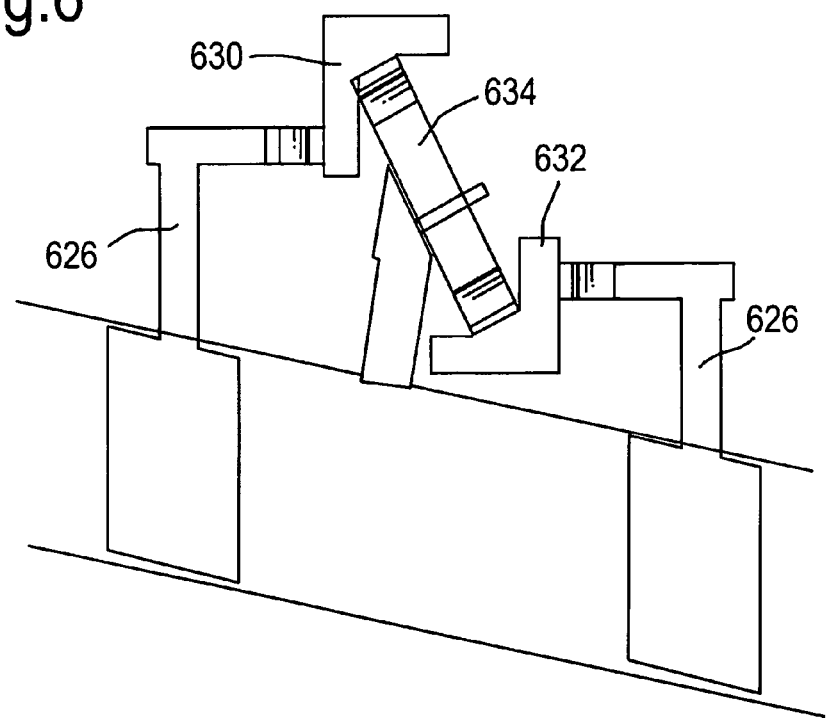
FIG. 6 shows a yet further embodiment of the present invention.

In yet a further embodiment as shown in FIG. 6, the rotational axis of the driving member 634 is angularly offset with regard to the principal axis 44 of the engine, rather than being axially or radially aligned to the principal axis 44. In this way, the driving member 634 can be arranged to resolve or balance out the radial and axial forces of the unison rings 630, 632 between the spindles 626 and unison rings 630, 632, thereby centralising and retaining the unison rings in place.

Figure 7:
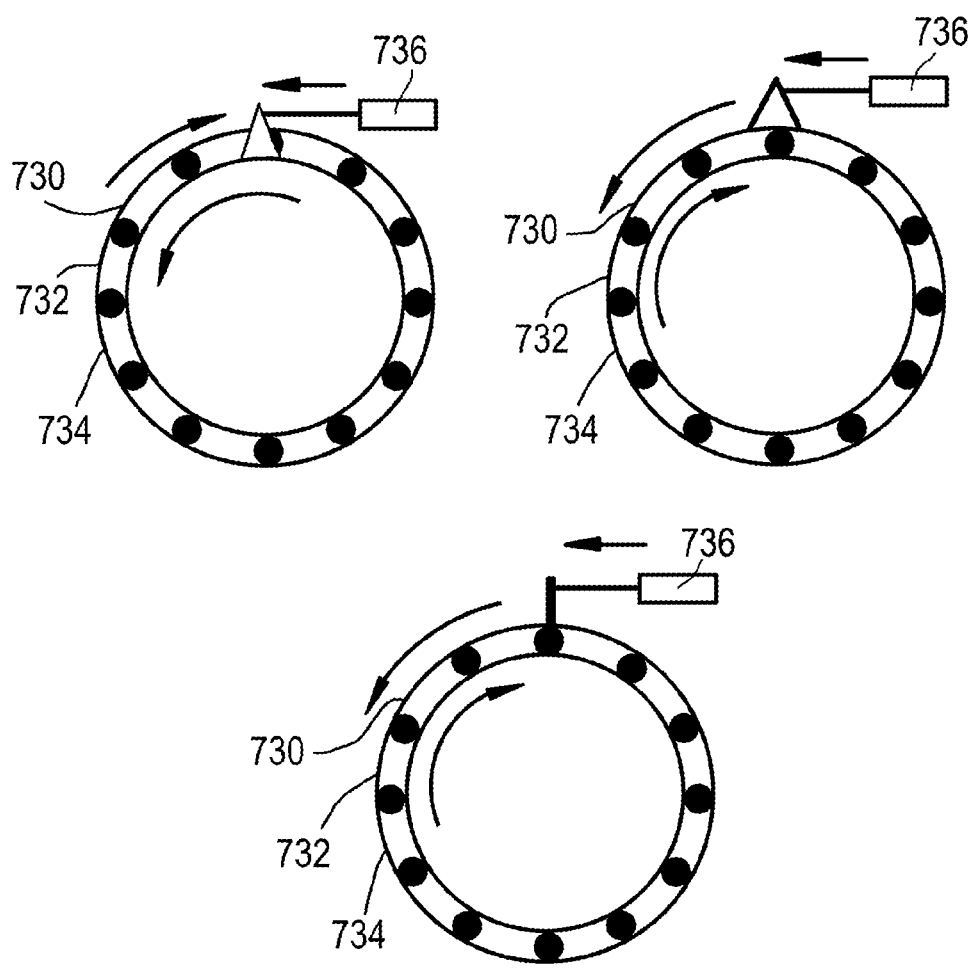
FIG. 7 shows various driving mechanisms for rotating the unison rings.

With reference to FIG. 7 and the above described embodiments, the unison ring gears 730, 732 and driving members 734 are interlocked such that rotating one of them results in the other two being rotated by a corresponding and proportional amount. Thus, as shown in FIG. 7, any of the gears can be attached to an actuation system 736 to provide the required rotative force. The actuation system 736 may be any suitable system known in the art such as electrical, pneumatic or hydraulic. The attachment between the respective gear and the actuation system can also be any suitable attachment as known in the art.

The unison ring gear arrangements described above may be made from metals e.g. steels, aluminum, titanium alloys etc. or, where the environment permits, composite materials may be considered for the gears to give a light weight design.

The invention is defined by the appended claims and the above described embodiments should not be taken as limiting the scope of those claims, they are examples only.

The invention claimed is:

1. A unison ring assembly, comprising:
   a first unison ring and a second unison ring concentrically aligned along a principal axis, the first and second unison rings being rotatable about the principal axis; and
   a gear mechanism configured to simultaneously rotate the first and second unison rings about the principal axis,
   wherein the gear mechanism includes a planetary gearset, and
   wherein a planet gear of the planetary gearset is eccentrically mounted so as to have a rotational axis that is offset by different amounts relative to each of the first and second unison rings.

2. The unison ring assembly as claimed in claim 1, wherein the first unison ring is a ring gear of the planetary gearset and the second unison ring is a sun gear of the planetary gearset.

3. The unison ring assembly as claimed in claim 2, wherein the rotational axis of the planet gear is closer to the second unison ring than to the first unison ring.

4. The unison ring assembly as claimed in claim 1, wherein the gear mechanism is configured to rotate the first and second unison rings at different speeds.

5. The unison ring assembly as claimed in claim 1,
   wherein the planet gear includes a first segment that engages with a ring gear of the planetary gearset and a second segment that engages with a sun gear of the planetary gearset, and
   wherein the gear ratio between the first segment and the ring gear is different than the gear ratio between the second segment and the sun gear.

6. The unison ring assembly as claimed in claim 1, wherein the first unison ring is radially outwards of the second unison ring with respect to the principal axis.

7. The unison ring assembly as claimed in claim 1,
   wherein the first and second unison rings include radially facing surfaces that oppose each other,
   wherein the planetary gearset comprises a plurality of planet gears distributed around the first and second unison rings so as to be between the radially facing surfaces, and
   wherein the planet gears are arranged to concentrically align the unison rings about the principal axis.

8. The unison ring assembly as claimed in claim 1,
   wherein the first and second unison rings include axially facing surfaces that oppose each other, and
   wherein the planet gear is provided between the axially facing surfaces to axially locate sun and ring gears of the planetary gearset relative to the principal axis.

9. The unison ring assembly as claimed in claim 8, wherein the rotational axis of the planet gear is angularly offset relative to the principal axis such that the planet gear is arranged to axially and radially align the first and second unison rings.

10. The unison ring assembly as claimed in claim 1, further comprising at least one actuator connected to and configured to directly rotate at least one of a ring gear, the planet gear, and a sun gear of the planetary gearset.

11. The unison ring assembly as claimed in claim 1, wherein the unison ring assembly is for a gas turbine engine.

12. A gas turbine engine comprising the unison ring assembly as claimed in claim 1.

13. The gas turbine engine as claimed in claim 12, wherein the first and second unison rings are connected to variable stator guide vanes.

14. The unison ring assembly as claimed in claim 1, wherein the planet gear is asymmetric about the rotational axis of the planet gear.

15. The unison assembly as claimed in claim 14,
   wherein the planet gear includes a first segment and a second segment, and
   wherein a radius of the first segment is greater than a radius of the second segment.

16. The unison assembly as claimed in claim 15, wherein the pitch of teeth of the first segment is greater than the pitch of teeth of the second segment.

17. The unison assembly as claimed in claim 16, wherein the first and second segments of the planet gear are pie-shaped.

18. The unison assembly as claimed in claim 1, wherein a range of angular rotation of the first unison ring is different than a range of angular rotation of the second unison ring for a common angle of the planet gear.

* * * * *